(12) United States Patent
Qiu et al.

(10) Patent No.: US 11,385,395 B1
(45) Date of Patent: Jul. 12, 2022

(54) LIGHT GUIDE PLATE AND DISPLAY DEVICE

(71) Applicant: JRD COMMUNICATION (SHENZHEN) LTD., Shenzhen (CN)

(72) Inventors: Zhuwei Qiu, Shenzhen (CN); Jitao Ma, Shenzhen (CN); Ke Lin, Shenzhen (CN); Yang Yu, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 17/203,696

(22) Filed: Mar. 16, 2021

(30) Foreign Application Priority Data

Feb. 7, 2021 (CN) .......................... 202110179873.3

(51) Int. Cl.
*G02B 6/00* (2006.01)
*F21V 8/00* (2006.01)
*G02F 1/1335* (2006.01)

(52) U.S. Cl.
CPC ..... *G02B 6/0043* (2013.01); *G02F 1/133514* (2013.01); *G02F 2202/28* (2013.01)

(58) Field of Classification Search
CPC ............. G02B 6/0043; G02F 1/133514; G02F 2202/28
See application file for complete search history.

(56) References Cited

U.S. PATENT DOCUMENTS

| 2005/0286854 A1 | 12/2005 | Honma et al. |
| 2008/0192504 A1 | 8/2008 | Chou |
| 2008/0285287 A1 | 11/2008 | Chang |
| 2013/0182458 A1* | 7/2013 | Van Der Lans ..... G02B 6/0035 362/613 |
| 2014/0098563 A1 | 4/2014 | Kim et al. |
| 2015/0212252 A1 | 7/2015 | Sakamoto |

FOREIGN PATENT DOCUMENTS

| CN | 102518974 A | 6/2012 |
| CN | 105158841 A | 12/2015 |
| CN | 107505771 A | 12/2017 |
| CN | 212341509 U | 1/2021 |
| EP | 3428694 A1 | 1/2019 |
| TW | 201115191 A | 5/2011 |
| WO | WO2013139016 A1 | 9/2013 |

OTHER PUBLICATIONS

European Search Report, European Application No. EP21162657.7, dated Sep. 1, 2021(10 pages).
Chinese first office action, Chinese application No. 2021101798733, dated Mar. 3, 2022(14 pages).

* cited by examiner

*Primary Examiner* — Anne M Hines (57) ABSTRACT

The present application discloses a light guide plate and a display device. The light guide plate has a light emitting surface configured to guide light out, the light emitting surface is provided with first micro structures, and the first micro structures protrude from the light emitting surface; the first micro structures are gradually tightly arranged on the light emitting surface inwards from the light incident surface; widths of the first micro structures gradually reduce inwards from the light incident surface. Light passes through the first micro structures protruding from the light emitting surface, an incident angle is reduced, so that the light is not prone to generate total reflection, a penetration rate of the light on the light emitting surface of the light guide plate is improved, and a light utility rate is increased.

17 Claims, 3 Drawing Sheets

LIGHT GUIDE PLATE AND DISPLAY DEVICE

CROSS-REFERENCE TO RELATED APPLICATIONS

The present disclosure claims foreign priority of Chinese Patent Application No. 202110179873.3, with the title of "LIGHT GUIDE PLATE AND DISPLAY DEVICE", filed on Feb. 7, 2021 by JRD COMMUNICATION (SHENZHEN) LTD. The entire contents of which are hereby incorporated by reference.

TECHNICAL FIELD

The present application relates to the field of display technology, and in particular, to a light guide plate and a display device.

BACKGROUND

At present, in a liquid crystal display device, liquid crystal molecules themselves cannot emit light, therefore an independent light source is required. An optical module usually comprises at least an LED lamp and a light guide plate, the light guide plate is provided thereon with micro structures, such as dots; the LED lamp is transformed into a planar light source through the dots to provide a light source for a display panel. However, much light is prone to generate reflection on a light emitting surface of the light guide plate and return into the light guide plate, therefore it cannot pass through the light emitting surface of the light guide plate, and a problem of a low light utility rate exists.

SUMMARY OF THE DISCLOSURE

Embodiments of the present application provides a light guide plate and a display device, which can reduce emission of light on a light emitting surface of the light guide plate, increase a penetration rate of light, and thereby increase a light utility rate.

A first aspect of the present application provides a light guide plate, the light guide plate has a light emitting surface configured to guide light out, the light emitting surface is provided with first micro structures, and the first micro structures protrude from the light emitting surface.

A second aspect of the present application provides a display device comprising a display panel and a light guide plate configured to supply light to the display panel, wherein the light guide plate comprises a light emitting surface configured to guide light out, the light emitting surface is provided with first micro structures, and the first micro structures protrude from the light emitting surface.

A third aspect of the present application provides a light guide plate, comprising: a light emitting surface; first micro structures formed on the light emitting surface and configured to reducing an incident angle of light reaching the light emitting surface; a diffusion surface arranged to be opposite to the light emitting surface; and second microstructures formed on the diffusion surface and configured to avoid light from passing through the diffusion surface.

Embodiments of the present application provides a light guide plate and a display device. The light guide plate has a light emitting surface configured to guide light out, the light emitting surface is provided with first micro structures, and the first micro structures protrude from the light emitting surface; the light guide plate further has a diffusion surface configured for light diffusion, the diffusion surface is arranged to be opposite to the light emitting surface, the diffusion surface is provided with second micro structures, and the second micro structures recess from the diffusion surface; a protruding height of the first micro structure is larger than a recessing depth of the second micro structure; the first micro structures are gradually tightly arranged on the light emitting surface inwards from the light incident surface; widths of the first micro structures gradually reduce inwards from the light incident surface; and widths of the second micro structures gradually increase inwards from the light incident surface. Therefore, light beams form even and uniform light through diffuse reflection and diffusion on the second micro structures, the light passes through the protruding structure of the first micro structures, an incident angle is reduced, total reflection is not prone to occur, and refraction is easier to occur, so that the light passes through the light emitting surface; a penetration rate of light on the light emitting surface of the light guide plate is improved, and a light utility rate is increased.

BRIEF DESCRIPTION OF THE DRAWINGS

Technical solutions and other advantageous effect of the present application will become apparent by describing specific embodiments of the present application in detail in accompany with the drawings below.

DETAILED DESCRIPTION

Technical solutions in embodiments of the present application will be described clearly and completely below in accompany with drawings in embodiments of the present application. Obviously, the described embodiments are merely some embodiments of the present application, but not all embodiments. Based on embodiments of the present application, all other embodiments obtained by one of ordinary skill in the art without paying any creative work belong to the protection scope of the present application.

In the description of the present application, it needs to be understood that orientations or positional relationships indicated by the terms "length", "width", "height", "depth", and so on are based on orientations or positional relationships shown in the drawings, which are only intended to facilitate the description of the present application and simplify the description, but not to indicate or imply that devices or elements referred to must have specific orientations or be configured and operated in specific orientations, and therefore cannot be understood as any limitation to the present application. In addition, terms "first" and "second" are only used for descriptive purposes, and cannot be understood as indicating or implying relative importance or implicitly indicating the number of indicated technical features. Therefore, features defined with "first" and "second" may explicitly or implicitly include one or more such feature(s). In the description of the present application, "multiple" means two or more than two, unless otherwise specifically defined.

The following disclosure provides many different embodiments or examples for realizing different structures of the present application. In order to simplify the disclosure of the present application, components and settings of specific examples are described below. Of course, they are only examples, and are not intended to limit the present application. In addition, the present application may repeat reference numerals and/or reference letters in different examples, and this repetition is for the purpose of simplification and clarity, itself does not indicate any relationship between various embodiments and/or settings as discussed. In addition, the present application provides examples of various specific processes and materials, but those of ordinary skill in the art may be aware of application of other processes and/or use of other materials.

A first aspect of the present application provides a light guide plate comprising a light emitting surface configured to guide light out, wherein the light emitting surface is provided with first micro structures, and the first micro structures protrude from the light emitting surface.

In some embodiments, the light guide plate further comprises a diffusion surface configured for light diffusion, wherein the diffusion surface is arranged to be opposite to the light emitting surface, the diffusion surface is provided with second micro structures, and the second micro structures recess from the diffusion surface.

In some embodiments, a protruding height of the first micro structure is larger than a recessing depth of the second micro structure.

In some embodiments, the light guide plate further comprises a light incident surface, wherein the light incident surface is an end surface of the light guide plate, and the light incident surface is adjacent to the light emitting surface and the diffusion surface respectively; the first micro structures are gradually tightly arranged on the light emitting surface inwards from the light incident surface.

In some embodiments, widths of the first micro structures gradually reduce inwards from the light incident surface.

In some embodiments, widths of the second micro structures gradually increase inwards from the light incident surface.

In some embodiments, processes of forming the first micro structures include at least: printing, hot pressing, etching, engraving, and injection molding processes.

In some embodiments, shapes of cross sections of the second micro structures comprise: circle, ellipse, arc, and triangular.

In some embodiments, shapes of cross sections of the first micro structures comprise: semicircle or semi ellipse.

A second aspect of the present application provides a display device comprising a display panel and a light guide plate configured to supply light to the display panel, wherein the light guide plate comprises a light emitting surface configured to guide light out, the light emitting surface is provided with first micro structures, and the first micro structures protrude from the light emitting surface.

In some embodiments, the display device further comprises: optical glue, a color film substrate, and an array substrate; wherein the display panel, the light guide plate, the optical glue, the color film substrate, and the array substrate are arranged layer by layer in sequence.

In some embodiments, the display device further comprises: optical glue, a color film substrate, and an array substrate; wherein the display panel, the optical glue, the color film substrate, the array substrate, and the light guide plate are arranged layer by layer in sequence.

In some embodiments, the light guide plate further comprises a diffusion surface configured for light diffusion, the diffusion surface is arranged to be opposite to the light emitting surface, the diffusion surface is provided with second micro structures, and the second micro structures recess from the diffusion surface.

In some embodiments, a protruding height of the first micro structure is larger than a recessing depth of the second micro structure.

In some embodiments, the light guide plate further comprises a light incident surface, the light incident surface is an end surface of the light guide plate, and the light incident surface is adjacent to the light emitting surface and the diffusion surface respectively; the first micro structures are gradually tightly arranged on the light emitting surface inwards from the light incident surface.

In some embodiments, widths of the first micro structures gradually reduce inwards from the light incident surface.

In some embodiments, widths of the second micro structures gradually increase inwards from the light incident surface.

A third aspect of the present application provides a light guide plate, comprising: a light emitting surface; first micro structures formed on the light emitting surface and configured to reducing an incident angle of light reaching the light emitting surface; a diffusion surface arranged to be opposite to the light emitting surface; and second microstructures formed on the diffusion surface and configured to avoid light from passing through the diffusion surface.

In some embodiments, the first micro structures protrude from the light emitting surface, the second micro structures recess from the diffusion surface, and a protruding height of the first micro structure is larger than a recessing depth of the second micro structure.

In some embodiments, the light guide plate further comprises a light incident surface, the light incident surface is an end surface of the light guide plate, and the light incident surface is adjacent to the light emitting surface and the diffusion surface respectively; the first micro structures are gradually tightly arranged on the light emitting surface inwards from the light incident surface; widths of the first micro structures gradually reduce inwards from the light incident surface, and widths of the second micro structures gradually increase inwards from the light incident surface.

Figure 1:
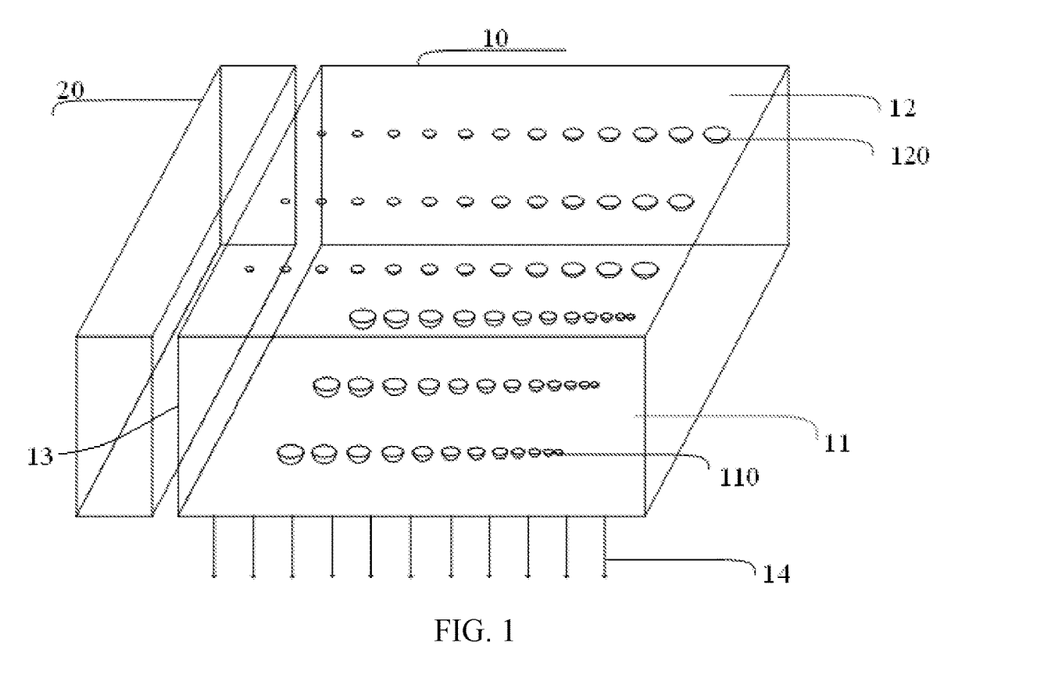
FIG. 1 is a schematic view of a light guide plate provided by an embodiment of the present application.

Referring to FIG. 1, a light guide plate 10 is provided. The light guide plate 10 is provided on a side thereof with an LED light bar 20, and the light guide plate 10 has a light emitting surface 11, a diffusion surface 12, and a light incident surface 13. The light incident surface 13 is located at a side of the light guide plate 10, and the light emitting surface 11 is arranged to be opposite to the light diffusion surface 12. The LED light bar 20 is arranged at an outer side of the light incident surface 13, light entering from the light incident surface 13 passes through second micro structures 120 on the light diffusion surface 12 and generates diffuse refraction and diffusion, so as to generate even and uniform light, which passes through first micro structures 110 on the light emitting surface 11 and enters a display panel.

Specifically, the first micro structures 110 protrude from the light emitting surface 11, and the first micro structures 110 are gradually tightly arranged on the light emitting surface 11 inwards from the light incident surface 13. Widths of the first micro structures 110 gradually reduce inwards from the light incident surface 13. Therefore, an arrangement density of the first micro structures gradually increases inwards from the light incident surface, and a penetration rate of light can be better increased.

In some embodiments, shapes of cross sections of the first micro structures comprise: semicircle, or semi ellipse, or other contours in any shapes protruding from the light emitting surface.

When light is emitted from an optically dense medium to an interface with an optically thinner medium, and an incident angle is equal to or greater than a critical angle, the light will be totally reflected. At present, a commonly used material of light guide plates is an optical grade acrylic material, its refractive index is about 1.4. It can be concluded that total reflection will occur when an incident angle of incident light is equal to or greater than 44°.

Figure 2:
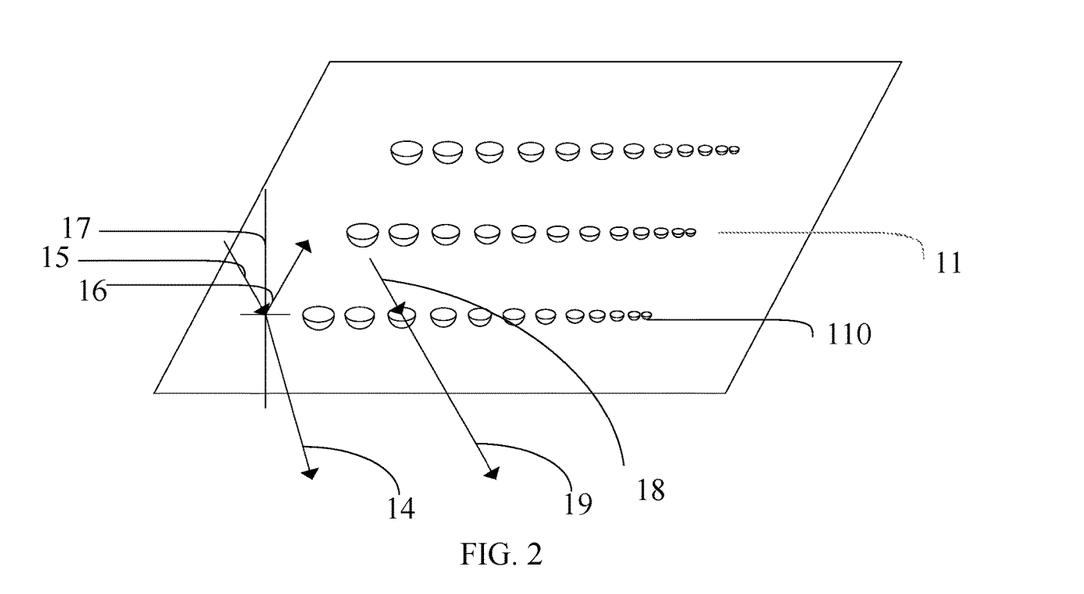
FIG. 2 is a schematic view of a light emitting surface provided by an embodiment of the present application.

Referring to FIG. 2, light entering from the light incident surface passes through the second micro structures on the diffusion surface and generates diffuse reflection and diffusion, so as to generate even and uniform light. Accordingly, assuming that light 15 and light 18 are parallel light, the light 15 does not pass through the first micro structure 110, while the light 18 pass through the first micro structure 110; the light 15 generates reflection and refraction when passing through a plane in which a normal 17 is perpendicular to the light emitting surface 11, and reflected light 16 and refracted light 14 are generated. At this time, only the light 14 can pass through the light emitting surface 11. Wherein, when an incident angle of the light 15 is equal to or greater than a critical angle, the light 15 only generates reflection and does not generate refraction, that is, generates total reflection, and the light 15 is entirely unable to pass through the light emitting surface 11 (such a case is not shown in the drawings).

Continuing to refer to FIG. 2, the light 18 passes through the first micro structures 110, cross sections of the first micro structures 110 can be contours in any shape protruding from the light emitting surface 11; the light 15 does not pass through the first micro structures 110. Therefore, in comparison with the light 15, an incident angle of the light 18 reduces, and the light 18 is more uneasy to generate total reflection. When a first micro structure 110 is regularly spherical, the light 18 passes through a spherical center of the first micro structure 110; the light 18 does not generate reflection and only generates refracted light 19, therefore a penetration rate of light can achieve the highest.

In some embodiments, a change amount of a distance between adjacent first micro structures is preferably 0.001-0.2 mm.

In some embodiments, an average diameter of the first micro structures can be about 35 micrometers, and a height of a first micro structure can be 5 micrometers to 15 micrometers.

Specifically, the diffusion surface 12 is provided thereon with an array formed by the second micro structures 120 (the distribution of the second micro structures 120 in FIG. 1 is only schematic). The second micro structures 120 recess from the diffusion surface 12, and widths of the second micro structures 120 gradually increase inwards from the light incident surface 13. Light intensity near a light entering side of the light incident surface is stronger, and light intensity far away from the light entering side is weaker; therefore, it is possible to configure that volumes of second micro structures 120 near the light entering side is smaller, and configure that volumes of second micro structures 120 far away from the light entering side is larger, this is conducive for uniform distribution of light.

In some embodiments, a protruding height of the first micro structure is larger than a recessing depth of the second micro structure. It can be regarded that the recessing depth of the second micro structure is smaller. Furthermore, first, before light of an LED light source enters the light guide plate, a light incident angle can be preset using a reflection sheet, for example, an incident angle of light entering the diffusion surface is adjusted to an angle being larger than 44°; second, since the recessing depth of the second micro structure is smaller, an incident angle of light on the second micro structure can be approximately equal to an originally preset incident angle; finally, light not only can generate diffuse reflection and diffusion on the second micro structure, but also can generate total reflection, such that not only can the action of homogenizing light be achieved, but also light can generate total reflection on the diffusion surface. Thus, light can be avoided from passing through the diffusion surface, and a light utility rate is improved.

In some embodiments, the second micro structures are evenly arranged on the diffusion surface 12 inwards from the light incident surface, alternatively, the second micro structures are gradually tightly arranged on the diffusion surface 12 inwards from the light incident surface.

In some embodiments, a change amount of a distance between adjacent second micro structures is preferably 0.001-0.2 mm.

In some embodiments, an average diameter of the second micro structures can be about 35 micrometers, and a height of a first micro structure can be 1 micrometer to 5 micrometers. Depths of the second micro structures are smaller, and a penetration rate for light to penetrate the light guide plate is lower.

In some embodiments, shapes of cross sections of the second micro structures can be fabricated into special shapes, such as circle, ellipse, arc, triangular, etc.

In some embodiments, processes of forming the first micro structures and/or the second micro structures can include at least: printing, hot pressing, etching, laser engraving, and injection molding processes.

Specifically, a light guide plate printing process may include the following steps: (1) providing an optical grade acrylic (PMMA)/polycarbonate (PS) or polystyrene (PS) light transmission plate, the light transmission plate has a light emitting surface for leading out light and a diffusion surface for diffusing light, the diffusion surface is arranged to be opposite to the light emitting surface; (2) printing a plurality of first micro structures using fast-drying IR curing ink on the light emitting surface of the light transmission plate, and printing a plurality of second micro structures on the diffusion surface; (3) placing the light transmission plate printed with the plurality of first microstructures and the plurality of second micro structures on a heating device controlled by a linear far-infrared programmable logic controller to perform heated curing in a stepped manner, thereby forming a light guide plate with the first micro structures and the second micro structures.

In some embodiments, any point light source or line light source can be used as a light source, and then transformed into a planar light source. The light source can include an LED, a CCFL (cold cathode lamp), a fluorescent tube, and the like.

In some embodiments, the light guide plate 10 can be provided with an LED light source on one side of the light incident surface; alternatively, at least four LED light sources are embedded in four corners of the light guide plate, and the at least four LED light sources are arranged into a light source array. The arrangement should be as even as possible. The at least four LED light sources are connected in parallel and led to power wires to facilitate connection with a power supply. The at least four of the LED light sources are connected by copper wires to form a parallel relationship.

From the above, it can be known that embodiments of the present application provide a light guide plate. The light guide plate has a light emitting surface configured to guide light out, the light emitting surface is provided with first micro structures, and the first micro structures protrude from the light emitting surface; the first micro structures are gradually tightly arranged on the light emitting surface inwards from the light incident surface; widths of the first micro structures gradually reduce inwards from the light incident surface. Light passes through the first micro structures protruding from the light emitting surface, an incident angle is reduced, so that the light is not prone to generate total reflection, a penetration rate of the light on the light emitting surface of the light guide plate is improved, and a light utility rate is increased.

Another embodiment of the present application provides a display device, and specifically relates to a reflective liquid crystal display device. A reflective liquid crystal display screen is a liquid crystal display equipped with a reflector, so that ambient light is used as a light source of the liquid crystal display, and a front light module is also set as a supplementary light source, thus it has the advantages of energy saving, eye protection, etc.

Figure 3:
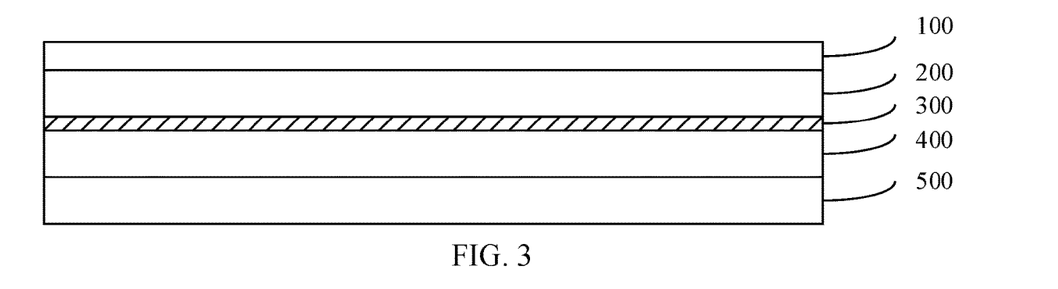
FIG. 3 is a schematic view of a reflection-type liquid crystal display provided by an embodiment of the present application.

Referring to FIG. 3, the display device can comprise a display panel 100, a light guide plate 200, optical glue 300, a color film substrate 400, and an array substrate 500, which are arranged layer by layer in sequence; wherein, point or line light sources, such as LED light sources, can be disposed at one side or four corners of the light guide plate 200. The light guide plate 200 has a light emitting surface, a diffusion surface, and a light incident surface, the light incident surface is located at a side surface of the light guide plate, and the light emitting surface is arranged to be opposite to the diffusion surface; an LED light bar is disposed on an outer side of the light incident surface, light entering from the light incident surface is reflected, refracted, and diffused by second micro structures on the diffusion surface to generate even and uniform light, which passes through first micro structures on the light emitting surface, and then passes through the optical glue 300, the color film substrate 400, and the array substrate 500 in sequence to supply light for the display panel 100 or other display components. The display panel 100 is preferably a touch panel.

In the light guide plate 200, the LED light bar is disposed at a side of the light guide plate 200, the light guide plate 200 has the light emitting surface, the diffusion surface, and the light incident surface; the light incident surface is located at a side surface of the light guide plate 200, and the light emitting surface is arranged to be opposite to the diffusion surface; the LED light bar is disposed on an outer side of the light incident surface, light entering from the light incident surface passes through second micro structures on the diffusion surface and generates diffuse reflection and diffusion to generate even and uniform light, and then passes through the first micro structure on the light emitting surface and enters a display panel.

Specifically, the first micro structures protrude from the light emitting surface, and the first micro structures are gradually tightly arranged on the light emitting surface inwards from the light incident surface. Widths of the first micro structures gradually reduce inwards from the light incident surface. Therefore, an arrangement density of the first micro structures gradually increases inwards from the light incident surface, and a penetration rate of light can be better increased.

In some embodiments, shapes of cross sections of the first micro structures comprise: semicircle, or semi ellipse, or other contours in any shapes protruding from the light emitting surface.

In some embodiments, a change amount of a distance between adjacent first micro structures is preferably 0.001-0.2 mm.

In some embodiments, an average diameter of the first micro structures can be about 35 micrometers, and a height of a first micro structure can be 5 micrometers to 15 micrometers.

Specifically, the diffusion surface is provided thereon with an array formed by the second micro structures. The second micro structures recess from the diffusion surface, and widths of the second micro structures gradually increase inwards from the light incident surface. Near a light entering side of the light incident surface, light intensity is stronger and volumes of the second micro structures are smaller; far away from the light entering side, light intensity is weaker and volumes of the second micro structures are larger; this is conducive for uniform distribution of light.

In some embodiments, a protruding height of the first micro structure is larger than a recessing depth of the second micro structure. It can be regarded that the recessing depth of the second micro structure is smaller. Furthermore, first, before light of an LED light source enters the light guide plate, a light incident angle can be preset using a reflection sheet, for example, an incident angle of light entering the diffusion surface is adjusted to an angle being larger than 44°; second, since the recessing depth of the second micro structure is smaller, an incident angle of light on the second micro structure can be approximately equal to an originally preset incident angle; finally, light not only can generate diffuse reflection and diffusion on the second micro structure, but also can generate total reflection, such that not only can the action of homogenizing light be achieved, but also light can generate total reflection on the diffusion surface. Thus, light can be avoided from passing through the diffusion surface, and a light utility rate is improved.

In some embodiments, the second micro structures are evenly arranged on the diffusion surface inwards from the light incident surface, alternatively, the second micro structures are gradually tightly arranged on the diffusion surface inwards from the light incident surface.

In some embodiments, a change amount of a distance between adjacent second micro structures is preferably 0.001-0.2 mm.

In some embodiments, an average diameter of the second micro structures can be about 35 micrometers, and a height of a first micro structure can be 1 micrometer to 5 micrometers. Depths of the second micro structures are smaller, and a penetration rate for light to penetrate the light guide plate is lower.

In some embodiments, shapes of cross sections of the second micro structures can be fabricated into special shapes, such as circle, ellipse, arc, triangular, etc.

In some embodiments, processes of forming the first micro structures and/or the second micro structures can include at least: printing, hot pressing, etching, laser engraving, and injection molding processes.

In some embodiments, any point light source or line light source can be used as a light source, and then transformed into a planar light source. The light source can include an LED, a CCFL (cold cathode lamp), a fluorescent tube, and the like.

In some embodiments, the light guide plate can be provided with an LED light source on one side of the light incident surface; alternatively, at least four LED light sources are embedded in four corners of the light guide plate, and the at least four LED light sources are arranged into a light source array. The arrangement should be as even as possible. The at least four LED light sources are connected in parallel and led to power wires to facilitate connection with a power supply. The at least four of the LED light sources are connected by copper wires to form a parallel relationship.

From the above, it can be known that embodiments of the present application provide a display device, the display device can comprise a touch panel, a light guide plate, optical glue, a color film substrate, and an array substrate, which are arranged layer by layer in sequence. The light guide plate has a light emitting surface configured to guide light out, the light emitting surface is provided with first micro structures, and the first micro structures protrude from the light emitting surface; the first micro structures are gradually tightly arranged on the light emitting surface inwards from the light incident surface; widths of the first micro structures gradually reduce inwards from the light incident surface. Light passes through the first micro structures protruding from the light emitting surface, an incident angle is reduced, so that the light is not prone to generate total reflection, a penetration rate of the light on the light emitting surface of the light guide plate is improved, and a light utility rate is increased.

Another embodiment of the present application provides a display device, which specifically relates to a liquid crystal display device. This display device, in comparison with the display device provided by the above embodiments, mainly differs in that: referring to FIG. 4, the display device can comprise a display panel 100*a*, optical glue 200*a*, a color film substrate 300*a*, an array substrate 400*a*, and a light guide plate 500*a*, which are arranged layer by layer in sequence; wherein, point or line light sources, such as LED light sources, can be disposed at one side or four corners of the light guide plate 500*a*. The light guide plate 500*a* has a light emitting surface, a diffusion surface, and a light incident surface, the light incident surface is located at a side surface of the light guide plate, and the light emitting surface is arranged to be opposite to the diffusion surface; an LED light bar is disposed on an outer side of the light incident surface, light entering from the light incident surface is reflected, refracted, and diffused by second micro structures on the diffusion surface to generate even and uniform light, which passes through first micro structures on the light emitting surface, and then passes through the array substrate 400*a*, the color film substrate 300*a*, the optical glue 200*a*, and the display panel 100*a* in sequence to supply light for the display panel 100*a* or other display components. The display panel 100*a* is preferably a touch panel.

Figure 4:
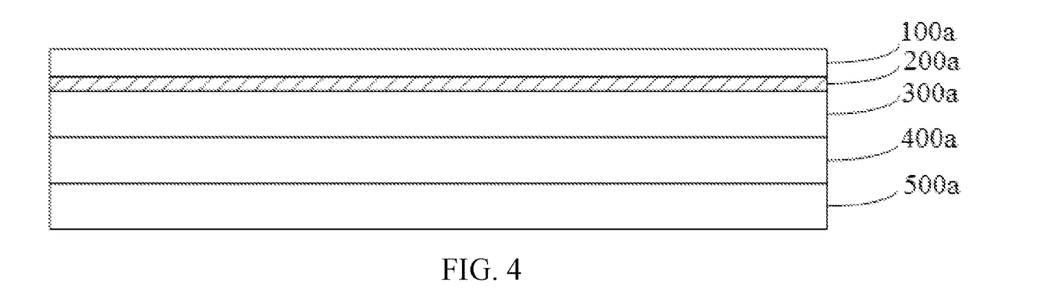
FIG. 4 is a schematic view of another liquid crystal display provided by an embodiment of the present application.

From the above, it can be known that embodiments of the present application provide a display device, the display device can comprise the display panel 100*a*, the optical glue 200*a*, the color film substrate 300*a*, the array substrate 400*a*, and the light guide plate 500*a*, which are arranged layer by layer in sequence. The light guide plate 500*a* has a light emitting surface configured to guide light out, the light emitting surface is provided with first micro structures, and the first micro structures protrude from the light emitting surface; the first micro structures are gradually tightly arranged on the light emitting surface inwards from the light incident surface; widths of the first micro structures gradually reduce inwards from the light incident surface. Light passes through the first micro structures protruding from the light emitting surface, an incident angle is reduced, so that the light is not prone to generate total reflection, a penetration rate of the light on the light emitting surface of the light guide plate is improved, and a light utility rate is increased.

Figure 5:
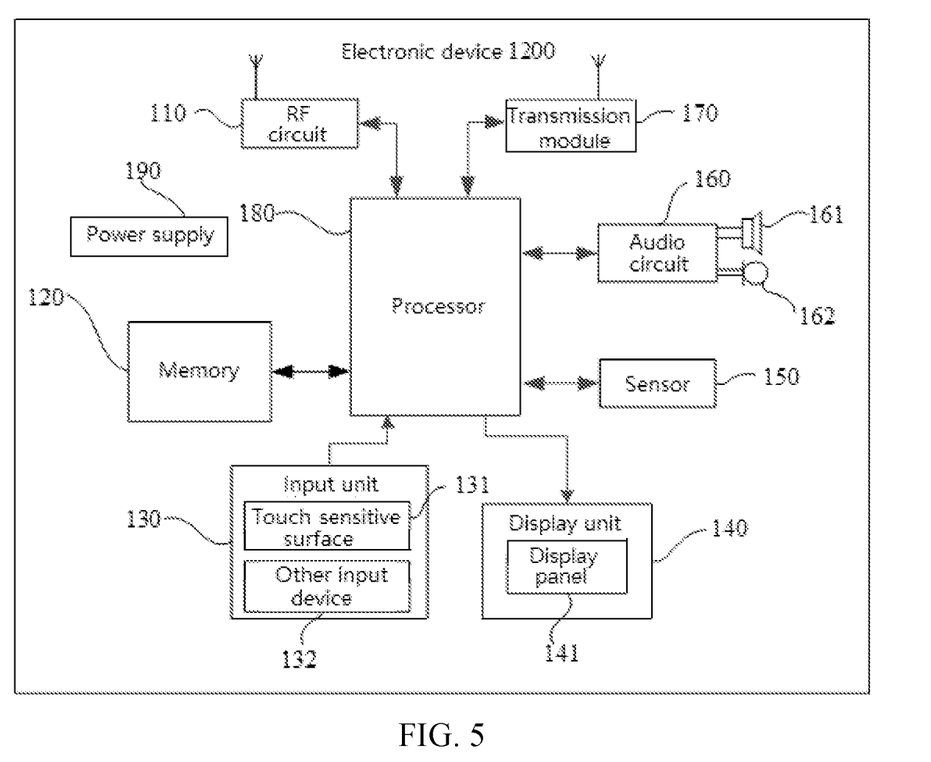
FIG. 5 is a structural schematic view of an electronic device provided by an embodiment of the present application.

A display device in embodiments of the present application is described above, and the electronic equipment in embodiments of the present application is described below from the perspective of hardware processing. Embodiments of the present application further provide an electronic device, as shown in FIG. 5, which shows a schematic structural diagram of the electronic device involved in embodiments of the present application. The electronic device may be a mobile phone, a computer, a digital broadcasting terminal, a message transceiving device, a game console, a tablet device, a medical equipment, a fitness equipment, a personal digital assistant, etc., specifically:

The electronic device 1200 may include an RF (Radio Frequency) circuit 110, a memory 120 including one or more (only one is shown in the figure) computer-readable storage medium, an input unit 130, a display unit 140, a sensor 150, an audio circuit 160, a transmission module 170, a processor 180 including one or more (only one is shown in the figure) processing core, a power supply 190, and other components. Those skilled in the art can understand that the structure of the electronic device 1200 shown in FIG. 5 does not constitute any limitation to the electronic device 1200, and may include more or less components than shown, or a combination of certain components, or a different arrangement of components. Wherein:

The RF circuit 110 is configured to receive and transmit electromagnetic waves, realize mutual conversion between electromagnetic waves and electric signals, and thereby communicate with a communication network or other devices. The RF circuit 110 may include various existing circuit elements for performing these functions, for example, an antenna, a radio frequency transceiver, a digital signal processor, an encryption/decryption chip, a subscriber identity module (SIM) card, a memory, and so on. The RF circuit 110 can communicate with various networks such as the Internet, an intranet, and a wireless network, or communicate with other devices through a wireless network.

The memory 120 can be configured to store software programs and modules, such as the program instructions/modules corresponding to the screen state control method in the above embodiments. The processor 180 executes various functional applications and data processing by running the software programs and modules stored in the memory 120. The memory 120 may include a high-speed random access memory, and may also include a non-volatile memory, such as one or more magnetic storage devices, flash memory, or other non-volatile solid-state memories. In some embodiments, the memory 120 may further include memories remotely provided relative to the processor 180, and these remote memories may be connected to the electronic device 1200 through a network. Examples of the aforementioned network include, but are not limited to, the Internet, corporate intranets, local area networks, mobile communication networks, and combinations thereof.

The input unit 130 can be configured to receive input digital or character information, and generate keyboard, mouse, joystick, optical or trackball signal input related to user settings and function control. Specifically, the input unit 130 may include a touch sensitive surface 131 and other input devices 132. The touch sensitive surface 131, also called a touch screen or a touch pad, can collect users' touch operations on or near it (for example, users use any suitable objects or accessories, such as fingers, stylus, etc., to operate on the touch sensitive surface 131 or near the touch sensitive surface 131), and drive corresponding connection devices according to a preset program. In addition to the touch sensitive surface 131, the input unit 130 may also include other input devices 132. Specifically, the other input device 132 may include, but is not limited to, one or more of a physical keyboard, function keys (such as a volume control button, a switch button, etc.), a trackball, a mouse, a joystick, and so on.

The display device 140 can be configured to display information input by users, information provided to users, and various graphical user interfaces of the electronic device 1200. These graphical user interfaces may be composed of graphics, texts, icons, videos, and any combination thereof. The display device 140 may include a display panel 141.

The display device 140 can comprise a touch panel, a light guide plate, optical glue, a color film substrate, and an array substrate which are arranged layer by layer in sequence, or a touch panel, optical glue, a color film substrate, an array substrate, and a light guide plate which are arranged layer by layer in sequence.

Wherein, point or line light sources, such as LED light sources, can be disposed at one side or four corners of the light guide plate. The light guide plate 200 has a light emitting surface, a diffusion surface, and a light incident surface, the light incident surface is located at a side surface of the light guide plate, and the light emitting surface is arranged to be opposite to the diffusion surface; an LED light bar is disposed on an outer side of the light incident surface, light entering from the light incident surface is reflected, refracted, and diffused by second micro structures on the diffusion surface to generate even and uniform light.

The LED light bar is disposed at a side of the light guide plate, the light guide plate has a light emitting surface, a diffusion surface, and a light incident surface, the light incident surface is located at a side surface of the light guide plate, and the light emitting surface is arranged to be opposite to the diffusion surface. The LED light bar is disposed on an outer side of the light incident surface, light entering from the light incident surface passes through second micro structures on the light diffusion surface and generates diffuse refraction and diffusion, so as to generate even and uniform light, which passes through first micro structures on the light emitting surface and enters a display panel.

Specifically, the first micro structures protrude from the light emitting surface, and the first micro structures are gradually tightly arranged on the light emitting surface inwards from the light incident surface. Widths of the first micro structures gradually reduce inwards from the light incident surface. Therefore, an arrangement density of the first micro structures gradually increases inwards from the light incident surface, and a penetration rate of light can be better increased.

In some embodiments, shapes of cross sections of the first micro structures comprise: semicircle, or semi ellipse, or other contours in any shapes protruding from the light emitting surface.

In some embodiments, a change amount of a distance between adjacent first micro structures is preferably 0.001-0.2 mm.

In some embodiments, an average diameter of the first micro structures can be about 35 micrometers, and a height of a first micro structure can be 5 micrometers to 15 micrometers.

Specifically, the diffusion surface is provided thereon with an array formed by the second micro structures. The second micro structures recess from the diffusion surface, and widths of the second micro structures gradually increase inwards from the light incident surface. Near a light entering side of the light incident surface, light intensity is stronger and volumes of the second micro structures are smaller; far away from the light entering side, light intensity is weaker and volumes of the second micro structures are larger; this is conducive for uniform distribution of light.

In some embodiments, a protruding height of the first micro structure is larger than a recessing depth of the second micro structure. It can be regarded that the recessing depth of the second micro structure is smaller. Furthermore, first, before light of an LED light source enters the light guide plate, a light incident angle can be preset using a reflection sheet, for example, an incident angle of light entering the diffusion surface is adjusted to an angle being larger than 44°; second, since the recessing depth of the second micro structure is smaller, an incident angle of light on the second micro structure can be approximately equal to an originally preset incident angle; finally, light not only can generate diffuse reflection and diffusion on the second micro structure, but also can generate total reflection, such that not only can the action of homogenizing light be achieved, but also light can generate total reflection on the diffusion surface. Thus, light can be avoided from passing through the diffusion surface, and a light utility rate is improved.

In some embodiments, the second micro structures are evenly arranged on the diffusion surface inwards from the light incident surface, alternatively, the second micro structures are gradually tightly arranged on the diffusion surface inwards from the light incident surface.

In some embodiments, a change amount of a distance between adjacent second micro structures is preferably 0.001-0.2 mm.

In some embodiments, an average diameter of the second micro structures can be about 35 micrometers, and a height of a first micro structure can be 1 micrometer to 5 micrometers. Depths of the second micro structures are smaller, and a penetration rate for light to penetrate the light guide plate is lower.

In some embodiments, shapes of cross sections of the second micro structures can be fabricated into special shapes, such as circle, ellipse, arc, triangular, etc.

In some embodiments, processes of forming the first micro structures and/or the second micro structures can include at least: printing, hot pressing, etching, laser engraving, and injection molding processes.

In some embodiments, any point light source or line light source can be used as a light source, and then transformed into a planar light source. The light source can include an LED, a CCFL (cold cathode lamp), a fluorescent tube, and the like.

In some embodiments, the light guide plate can be provided with an LED light source on one side of the light incident surface; alternatively, at least four LED light sources are embedded in four corners of the light guide plate, and the at least four LED light sources are arranged into a light source array. The arrangement should be as even as possible. The at least four LED light sources are connected in parallel and led to power wires to facilitate connection with a power supply. The at least four of the LED light sources are connected by copper wires to form a parallel relationship.

From the above, it can be known that embodiments of the present application provide an electronic device, the electronic device comprises a display device, the display device can comprise: a touch panel, a light guide plate, optical glue, a color film substrate, and an array substrate which are arranged layer by layer in sequence, or a touch panel, optical glue, a color film substrate, an array substrate, and a light guide plate which are arranged layer by layer in sequence. The light guide plate has a light emitting surface configured to guide light out, the light emitting surface is provided with first micro structures, and the first micro structures protrude from the light emitting surface; the first micro structures are gradually tightly arranged on the light emitting surface inwards from the light incident surface; widths of the first micro structures gradually reduce inwards from the light incident surface. Light passes through the first micro structures protruding from the light emitting surface, an incident angle is reduced, so that the light is not prone to generate total reflection, a penetration rate of the light on the light emitting surface of the light guide plate is improved, and a light utility rate is increased.

The electronic device 1200 may further include at least one kind of sensor 150, such as a light sensor, a motion sensor, and other sensors. As for other sensors such as a barometer, a hygrometer, a thermometer, an infrared sensor, etc., which can be further configured for the electronic device 1200, they will not be repeated here.

The audio circuit 160, the speaker 161, and the microphone 162 can provide an audio interface between a user and the electronic device 1200. The audio circuit 160 can transmit an electrical signal converted from the received audio data to the speaker 161, and it is converted into a sound signal for output by the speaker 161; on the other hand, the microphone 162 converts a collected sound signal into an electrical signal, which is received by the audio circuit 160 and converted into audio data; the audio data is then output to the processor 180 to process, and sent to, for example, another terminal via the RF circuit 110, or the audio data is output to the memory 120 for further processing. The audio circuit 160 may also include an earplug jack to provide communication between a peripheral earphone and the electronic device 1200.

The electronic device 1200 can help users send and receive emails, browse web pages, and access streaming media through the transmission module 170 (e.g., a Wi-Fi module), and it provides users with wireless broadband Internet access. Although FIG. 5 shows the transmission module 170, it is understandable that it is not a necessary component of the electronic device 1200, and can be omitted as needed without changing the essence of the invention.

The processor 180 is the control center of the electronic device 1200. It uses various interfaces and lines to connect various parts of an entire mobile phone, performs various functions of the electronic device 1200 and processes data by running or executing software programs and/or modules stored in the memory 120 and calling data stored in the memory 120, and thereby monitors the mobile phone as a whole. Optionally, the processor 180 may include one or more processing cores; in some embodiments, the processor 180 may integrate an application processor and a modem processor, wherein the application processor mainly processes an operating system, a user interface, application programs, etc., and the modem processor mainly processes wireless communication. It can be understood that the foregoing modem processor may also not be integrated into the processor 180.

The electronic device 1200 further includes a power source 190 (such as a battery) for supplying power to various components. The power source may be logically connected to the processor 180 through a power management system, and thereby realize functions such as charging management, discharging, and power management through the power management system. The power supply 190 may also include any components such as one or more DC or AC power supply, a recharging system, a power failure detection circuit, a power converter or inverter, a power status indicator, and so on.

Although not shown, the electronic device 1200 may also include a camera (such as a front camera, a rear camera), a Bluetooth module, etc., which will not be repeated here. Specifically, in this embodiment, the display unit 140 of the electronic device 1200 is a touch screen display, and the electronic device 1200 further includes a memory 120 and one or more program, wherein the one or more program is stored in the memory 120 and configured in such a way that the program stored in the memory 120 is executed by one or more processor 180 to realize various functions.

In the above-mentioned embodiments, the description of each embodiment has its own emphasis. For parts that are not described in detail in a certain embodiment, reference may be made to related descriptions of other embodiments.

A light guide plate provided by embodiments of the present application is described in detail above, and specific examples are used in this disclosure to describe principles and implementations of the present application. The description of the above embodiments is only used to help understand technical solutions of the present application and their core ideas. Those of ordinary skill in the art should understand that: they can still modify the technical solutions recorded in the foregoing embodiments, or equivalently replace some technical features therein; these modifications or replacements do not make the essence of corresponding technical solutions deviate from the scope of the technical solutions of the embodiments of the present application.

What is claimed is:

1. A light guide plate comprising a light emitting surface configured to guide light out, wherein the light emitting surface is provided with first micro structures, and the first micro structures protrude from the light emitting surface;
   wherein the light guide plate further comprises a light incident surface, wherein the light incident surface is an end surface of the light guide plate, and the light incident surface is adjacent to the light emitting surface; the first micro structures are arranged in a way that the farther the elements are from the light incident surface, the distance between the elements gets smaller; and the first micro structures are arranged in a way that the farther the elements are from the light incident surface, the dimensions of the elements gets smaller.

2. The light guide plate according to claim 1, further comprising a diffusion surface configured for light diffusion, wherein the diffusion surface is arranged to be opposite to the light emitting surface, the diffusion surface is provided with second micro structures, and the second micro structures recess from the diffusion surface.

3. The light guide plate according to claim 2, wherein, a protruding height of the first micro structure is larger than a recessing depth of the second micro structure.

4. The light guide plate according to claim 2, wherein the light incident surface is adjacent to the diffusion surface.

5. The light guide plate according to claim 4, wherein, the second micro structures are arranged in a way that the farther the elements are from the light incident surface, the dimensions of the elements gets larger.

6. The light guide plate according to claim 2, wherein, processes of forming the first micro structures include at least: printing, hot pressing, etching, engraving, and injection molding processes.

7. The light guide plate according to claim 2, wherein, shapes of cross sections of the second micro structures comprise: circle, ellipse, arc, and triangular.

8. The light guide plate according to claim 1, wherein, shapes of cross sections of the first micro structures comprise: semicircle or semi ellipse.

9. A display device comprising a display panel and a light guide plate configured to supply light to the display panel, wherein the light guide plate comprises a light emitting surface configured to guide light out, the light emitting surface is provided with first micro structures, and the first micro structures protrude from the light emitting surface;
wherein the light guide plate further comprises a light incident surface, wherein the light incident surface is an end surface of the light guide plate, and the light incident surface is adjacent to the light emitting surface; the first micro structures are arranged in a way that the farther the elements are from the light incident surface, the distance between the elements gets smaller; and the first micro structures are arranged in a way that the farther the elements are from the light incident surface, the dimensions of the elements gets smaller.

10. The display device according to claim 9, further comprising: optical glue, a color film substrate, and an array substrate; wherein the display panel, the light guide plate, the optical glue, the color film substrate, and the array substrate are arranged layer by layer in sequence.

11. The display device according to claim 9, further comprising: optical glue, a color film substrate, and an array substrate; wherein the display panel, the optical glue, the color film substrate, the array substrate, and the light guide plate are arranged layer by layer in sequence.

12. The display device according to claim 9, wherein the light guide plate further comprises a diffusion surface configured for light diffusion, the diffusion surface is arranged to be opposite to the light emitting surface, the diffusion surface is provided with second micro structures, and the second micro structures recess from the diffusion surface.

13. The display device according to claim 12, wherein, a protruding height of the first micro structure is larger than a recessing depth of the second micro structure.

14. The display device according to claim 12, wherein the light incident surface is adjacent to the diffusion surface.

15. The display device according to claim 14, wherein, the second micro structures are arranged in a way that the farther the elements are from the light incident surface, the dimensions of the elements gets larger.

16. A light guide plate, comprising:
a light emitting surface;
first micro structures formed on the light emitting surface and configured to reducing an incident angle of light reaching the light emitting surface;
a diffusion surface arranged to be opposite to the light emitting surface;
second microstructures formed on the diffusion surface and configured to avoid light from passing through the diffusion surface; and
a light incident surface, wherein the light incident surface is an end surface of the light guide plate, and the light incident surface is adjacent to the light emitting surface and the diffusion surface respectively: the first micro structures are arranged in a way that the farther the elements are from the light incident surface, the distance between the elements gets smaller; the first micro structures are arranged in a way that the farther the elements are from the light incident surface, the dimensions of the elements gets smaller; and the second micro structures are arranged in a way that the farther the elements are from the light incident surface, the dimensions of the elements gets larger.

17. The light guide plate according to claim 16, wherein the first micro structures protrude from the light emitting surface, the second micro structures recess from the diffusion surface, and a protruding height of the first micro structure is larger than a recessing depth of the second micro structure.

* * * * *